US012367547B2

(12) United States Patent
Cai et al.

(10) Patent No.: US 12,367,547 B2
(45) Date of Patent: Jul. 22, 2025

(54) SUPER RESOLUTION USING CONVOLUTIONAL NEURAL NETWORK

(71) Applicant: Intel Corporation, Santa Clara, CA (US)

(72) Inventors: Xiaoxia Cai, Beijing (CN); Chen Wang, San Jose, CA (US); Huan Dou, Beijing (CN); Yi-Jen Chiu, San Jose, CA (US); Lidong Xu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 311 days.

(21) Appl. No.: 17/793,341

(22) PCT Filed: Feb. 17, 2020

(86) PCT No.: PCT/CN2020/075540
§ 371 (c)(1),
(2) Date: Jul. 15, 2022

(87) PCT Pub. No.: WO2021/163844
PCT Pub. Date: Aug. 26, 2021

(65) Prior Publication Data
US 2023/0052483 A1    Feb. 16, 2023

(51) Int. Cl.
*G06T 3/4046*    (2024.01)
*G06T 3/4053*    (2024.01)

(52) U.S. Cl.
CPC .......... *G06T 3/4046* (2013.01); *G06T 3/4053* (2013.01)

(58) Field of Classification Search
CPC ................ G06T 3/4046; G06T 3/4053; G06T 2207/20084; G06T 2207/20081;
(Continued)

(56) References Cited

U.S. PATENT DOCUMENTS

| | | | | |
|---|---|---|---|---|
| 2006/0104540 A1* | 5/2006 | Haussecker | ........... | G06T 3/4053 382/299 |
| 2011/0221966 A1* | 9/2011 | Hsieh | .................... | G06T 3/4053 348/665 |

(Continued)

FOREIGN PATENT DOCUMENTS

| | | | | | |
|---|---|---|---|---|---|
| CN | 107492070 | | 12/2017 | | |
| CN | 108109109 A | * | 6/2018 | ........... | G06N 3/0454 |

(Continued)

OTHER PUBLICATIONS

Lim et al., "Enhanced Deep Residual Networks for Single Image Super-Resolution," 2017 IEEE Conference on Computer Vision and Pattern Recognition Workshops, Jul. 21-26, 2017, 9 pages.
(Continued)

*Primary Examiner* — Henok Shiferaw
*Assistant Examiner* — Woo C Rhim
(74) *Attorney, Agent, or Firm* — Hanley, Flight & Zimmerman, LLC

(57) ABSTRACT

An apparatus for super resolution imaging includes a convolutional neural network (104) to receive a low resolution frame (102) and generate a high resolution illuminance component frame. The apparatus also includes a hardware scaler (106) to receive the low resolution frame (102) and generate a second high resolution chrominance component frame. The apparatus further includes a combiner (108) to combine the high resolution illuminance component frame and the high resolution chrominance component frame to generate a high resolution frame (110).

20 Claims, 11 Drawing Sheets

(58) Field of Classification Search
CPC ... G06T 3/4007; G06T 3/4076; G06T 3/4061; G06T 3/4069; G06T 2207/20221; G06T 5/73; G06T 5/00; G06T 2207/20212; G06N 3/045; G06N 3/048; G06N 3/084; G06N 3/08; G06N 3/0464; G06N 3/02; G06N 3/044; G06N 20/00; G06N 3/047; H04N 23/951; H04N 19/59; H04N 13/106; H04N 7/0117; G06V 10/82; G06V 10/7715

See application file for complete search history.

(56) References Cited

U.S. PATENT DOCUMENTS

| | | | |
|---|---|---|---|
| 2018/0336662 A1 | 11/2018 | Kimura | |
| 2018/0365794 A1* | 12/2018 | Lee | G06N 3/048 |
| 2019/0026864 A1* | 1/2019 | Chen | G06T 3/4053 |
| 2019/0045168 A1* | 2/2019 | Chaudhuri | G06T 3/4053 |
| 2019/0138838 A1* | 5/2019 | Liu | G06T 3/4053 |
| 2019/0347847 A1* | 11/2019 | Elgharib | G06T 15/205 |
| 2020/0034948 A1* | 1/2020 | Park | G06N 3/088 |
| 2020/0193566 A1* | 6/2020 | Croxford | G02B 27/0172 |
| 2020/0311870 A1* | 10/2020 | Jung | G06T 3/4053 |
| 2020/0402205 A1* | 12/2020 | Su | G06T 5/70 |
| 2021/0004935 A1* | 1/2021 | Yao | G06T 3/4084 |
| 2021/0021866 A1* | 1/2021 | Djokovic | H04N 19/85 |
| 2021/0049740 A1* | 2/2021 | Cho | G06T 3/4046 |
| 2021/0112261 A1* | 4/2021 | Hwang | G06T 7/90 |
| 2021/0125380 A1* | 4/2021 | Lee | H04N 19/117 |
| 2021/0133926 A1* | 5/2021 | Jia | G06T 3/4053 |
| 2021/0166345 A1* | 6/2021 | Kim | G06Q 30/08 |
| 2021/0224951 A1 | 7/2021 | Ahn et al. | |
| 2021/0366081 A1* | 11/2021 | Kim | G06T 3/4007 |
| 2022/0004855 A1* | 1/2022 | He | G06N 3/045 |
| 2022/0188976 A1* | 6/2022 | Sun | H04N 19/176 |
| 2023/0216986 A1* | 7/2023 | Kim | G06N 3/08 382/232 |

FOREIGN PATENT DOCUMENTS

| | | | | |
|---|---|---|---|---|
| CN | 108805814 | | 11/2018 | |
| CN | 108876721 A | * | 11/2018 | G06K 9/6221 |
| CN | 109413434 A | * | 3/2019 | G06T 3/4053 |
| CN | 109862370 A | * | 6/2019 | |
| CN | 110428382 A | * | 11/2019 | G06T 3/4046 |
| CN | 110751597 | | 2/2020 | |
| JP | 2016115313 | | 6/2016 | |
| JP | 2018195069 | | 12/2018 | |
| JP | 2019139713 | | 8/2019 | |
| KR | 20190105769 | | 9/2019 | |
| KR | 20190105769 A | * | 9/2019 | |
| KR | 20200008343 | | 1/2020 | |
| WO | 2019178133 | | 9/2019 | |
| WO | 2021163844 | | 8/2021 | |

OTHER PUBLICATIONS

Kawashima et al., "Super-Resolution Method for Satellite Images Using Deep Learning," Journal of the Remote Sensing Society of Japan, vol. 38, Issue 2, Apr. 20, 2018, 12 pages. [English language machine translation included.].

Japanese Patent Office, "Search Report by Registered Search Organization," issued in connection with Japanese Patent Application No. 2022-543379, dated Dec. 26, 2023, 70 pages. [English language machine translation included.].

Japanese Patent Office, "Decision to Grant a Patent" issued in connection with Japanese Patent Application No. 2022-543379, dated May 21, 2024, 5 pages. [English language machine translation included.].

International Searching Authority, "International Search Report," issued Nov. 20, 2020 in connection with International Patent Application No. PCT/CN2020/075540, 5 pages.

International Searching Authority, "Written Opinion," issued Nov. 20, 2020 in connection with International Patent Application No. PCT/CN2020/075540, 4 pages.

Wang et al., "Self-Tuned Deep Super Resolution," 2015 IEEE Conference on Computer Vision and Pattern Recognition Workshops (CVPRW), Jun. 7, 2015, 8 pages.

Tang et al., "Deep Residual Networks with a Fully Connected Recon-struction Layer for Single Image Super-Resolution," AInnovation Co. Ltd., Arxiv, May 24, 2018, 32 pages.

Sharma et al., "IRGUN: Improved Residue Based Gradual Upscaling Network for Single Image Super Resolution", 2018 IEEE/CVF Conference on Computer Vision and Pattern Recognition Workshops (CVPRW), Jun. 18, 2018, 10 pages.

Truong et al., "Deep Learning-Based Super-Resolution Reconstruction and Marker Detection for Drone Landing", IEEE Access, vol. 7, ISSN: 2169-3536, May 9, 2019, 18 pages.

International Searching Authority, "International Preliminary Report on Patentability," issued in connection with International Patent Application No. PCT/CN2020/075540, issued on Aug. 23, 2022, 4 pages.

European Patent Office, "Extended European Search Report," issued in connection with European Patent Application No. 20920121.9-1210, dated Nov. 2, 2023, 9 pages.

Japanese Patent Office, "Notice of Reasons for Rejection," issued Feb. 6, 2024, in connection with Japanese Patent Application No. 2022-543379, 5 pages (including translation).

Indian Patent Office, "Examination Report" issued in connection with Indian Patent Application No. 202247041134, dated May 16, 2025, 6 pages. [English translation included].

* cited by examiner

100

500

900

SUPER RESOLUTION USING CONVOLUTIONAL NEURAL NETWORK

This Patent arises from a U.S. National Stage Patent Application under 35 U.S.C. § 371 of PCT Patent Application No. PCT/CN2020/075540, filed Feb. 17, 2020, and entitled "SUPER RESOLUTION USING CONVOLUTIONAL NEURAL NETWORK." PCT Patent Application No. PCT/CN2020/075540 is hereby incorporated herein by reference in its entirety.

BACKGROUND

Super-resolution imaging (SR) is a class of techniques that increase the resolution of images processed by an imaging system. For example, low resolution images may be converted into high resolution images with improved details using various SR techniques.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
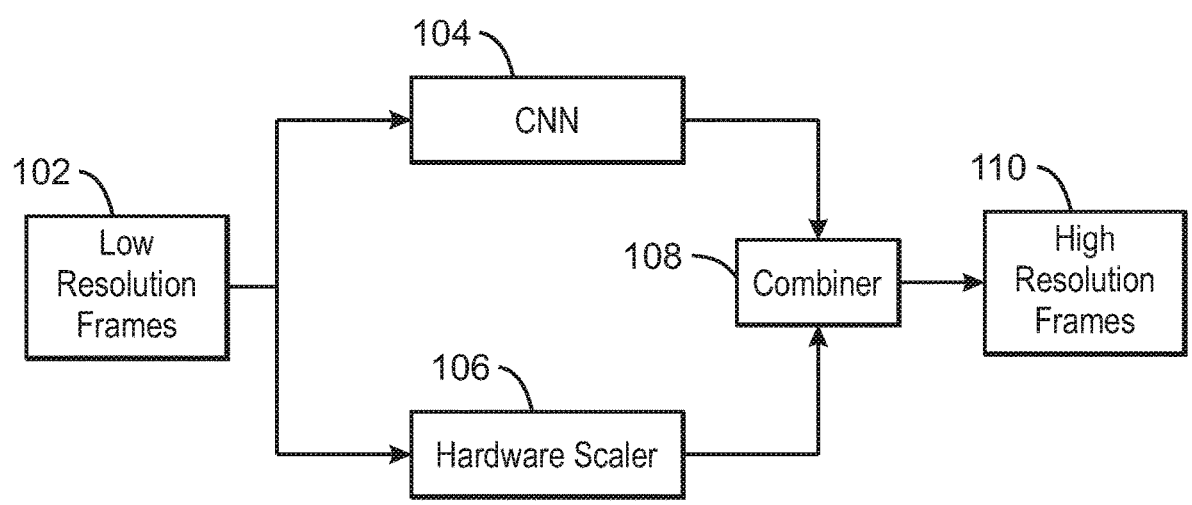
FIG. 1 is a block diagram illustrating an example system for super resolution using a scalable neural network.

Deep learning based super resolution may be used in restoring low resolution images and video frames to high resolution images and video frames. Currently, deep learning based methods may conduct training processes based on low and high resolution image pairs obtained by certain downsampling techniques. For example, a conventional super resolution technique using low resolution images downscaled with a bicubic filter may be used. For example, a conventional super resolution technique may use low resolution images downscaled by the bicubic filter. Some blind super resolution systems may further improve this downscaling process by combining bicubic filter with Gaussian smoothing using multiple kernels. This kind of training process may work for nature content. However, in screen or gaming content, severe overshoot and undershoot artifacts may be observed after the upscaling of sharp edges. As used herein, overshooting artifact are artifacts that appear as spurious bands or "ghosts" near edges. Overshooting artifacts may also be referred to as ringing artifacts. Nature content is video containing camera-captured video scenes. For example, nature content may contain fewer sharp edges. Screen content is video containing a significant portion of rendered graphics (excluding games), text, or animation rather than camera-captured video scenes. Gaming content is a significant portion of rendered game.

For deep learning based super resolution, two approaches are sometimes used to achieve higher quality output. For example, deep convolution networks may be used as a post-processing model of a traditional scaler to enhance details of the images and video resized by conventional methods such as bilinear, bicubic, Lanczos filters, etc. However, this may introduce a large computation workload to an inference device, especially when the input resolution of the images or videos is high. Another way to achieve higher quality output is to directly take a low resolution image or video frame as input, and then utilize a convolutional network to restore the details of high resolution images. For example, the convolutional network can be used to apply a series of neural network layers first to the low-resolution video frames to exact import feature maps used to restore high resolution details. After that, a dedicated neural network layer may upscale the low-resolution feature maps to a high-resolution output. In this way, part of a workload can be shifted to low resolution features. Shifting the workload in this manner may reduce the computation and bandwidth overhead compared with the previous way, as most of the compute may be conducted on the low-resolution instead of high-resolution.

Downsampling the ground truth high resolution training image to obtain a low resolution image is a straight forward and easy way to get training pairs for a neural network that may work for most nature content. However, for screen or gaming content, which may contain an extremely high frequency in the frequency domain, the high frequency information may be corrupted after the downsampling process. For example, a frame may be first transferred to the frequency domain by using certain kind of transformation. The transformation may be a discrete cosine transform, or a discrete Fourier transform. The main purpose of such transformation may be to use a linear combination of different bases to represent the image. The bases defined by each transform may contains various signals with different frequencies ranging from a very low frequency to a very high frequency. For sharp edges in the spatial or image domain, in order to represent this signal in the frequency domain, many high frequency bases may be used. Thus, sharp edges may usually contain much higher frequency components than the others. Moreover, downsampling using interpolation, such as via bilinear, bicubic, Lanczos, or other filters, may tend to corrupt such high frequency components. The neural network may never be able to learn how to process such high frequency input. Thus, when applied to real screen content cases, which in contrast to a training process may not suffer from any frequency corruption, artifacts may occur because that high frequency information is emphasized in an improper way.

In some examples, after a data augmentation tuning process, overshooting artifacts may almost be removed. However, the final high-resolution output may become blurry when compared with the results without using data augmentation, which may also cause some quality drop on other texture contents. The output becomes blurry compared with the result before tuning. Such overshooting issue may happen along black lines, and may be caused by using a rectified linear unit (ReLU) activation. Moreover, images or videos with repeated patterns may also display aliasing artifacts.

The present disclosure relates generally to techniques for super resolution using scalable neural networks. For example, the techniques include training methods and an example inference topology. First, in a data preparation stage, instead of traditional interpolation based downsampling process such as bilinear or bicubic downsampling, a nearest neighbor downsampling may be used for screen content for additional data augmentation. In the training stage, in addition to using an L1/L2 loss function, a self-similarity loss is used as part of the loss function to deal with aliasing artifacts. For the inference topology, the techniques also include a small scale network based on an enhanced deep super-resolution (EDSR) and replacing a ReLU activation with a parametric rectified linear unit (PReLU) activation to improve robustness of the network.

The techniques described herein thus enable elimination of overshoot, undershoot and aliasing problems in screen content without affecting the sharpness in restored image or video. The designed network can help users enable real time high quality super resolution with input videos of any resolution, such as with a resolutions of 1280×720 (720p), 1920×1080 (1080p), 2560×1440 (1440p), or more. For example, by only processing an illuminance channel via a convolutional neural network and using a hardware upscaler to process chrominance channels, the techniques may efficiently process video frames using less computational resources. In addition, the techniques described herein can eliminate artifacts in screen and gaming content with almost no side effects on the appearance of nature content. Thus, the techniques herein may be used to enhance the quality of images and video frames for nature, screen and gaming content.

FIG. 1 is a block diagram illustrating an example system for super resolution using a scalable neural network. The example system 100 can be implemented in the computing device 1000 in FIG. 10 using the methods 600-900 of FIGS. 6-9. For example, the system 100 can be trained using the methods 600 and 700 of FIGS. 6 and 7 and executed using the methods 800 and 900 of FIGS. 8 and 9.

The example system 100 includes a low resolution frames 102. The system 100 includes a convolutional neural network (CNN) 104 communicatively coupled to a source of the low resolution frames 102. The system 100 further includes a hardware scaler 106 communicatively coupled to the source of the low resolution frames 102. The system 100 also further includes a combiner 108 communicatively coupled to the convolutional neural network (CNN) 104 and the hardware scaler 106.

The system 100 of FIG. 1 illustrates an inference framework that directly takes low resolution video frames as input and utilizes a convolution neural network 104 to restore the details in an output high resolution frame 110. In particular, the low resolution frame 102 may be fed into a CNN 104 and a hardware scaler 106. In some examples, the low resolution frame 102 may in a YUV420 format, where the size of the UV channels may be one fourth the size of the illuminance channel Y. The YUV format encodes a color image or video taking human perception into account, allowing reduced bandwidth for chrominance components. In some examples, a color conversion from RGB to YUV may be applied.

In various examples, the hardware scaler 106 may be an upsampler using a particular scaling factor. In some examples, the scaling factor is determined by the different sampling rates of high resolution and low resolution pairs of frames. For example, to convert 360p to 720p, the scaling factor is 2×. For example, the hardware scaler 106 can receive a low resolution image or video frame as input and upsamples the chrominance components image or video by two times in each direction. The output of the hardware scaler 106 may thus be high resolution images or video frames. For example, the high resolution images or video frames generated by the hardware scaler 106 may have a resolution of twice the input low resolution frames.

The CNN 104 may be any upscaling framework that takes low resolution frames 102 as input. The CNN 104 may be trained to learn a residual between the output of the neural network given a training pair including a low resolution input frame and a ground truth high resolution frame. For example, a number of weights of the neural network may be modified based on the calculated residual. In this manner, the CNN 104 may have been iteratively trained to output frames more closely resembling the ground truth of input low resolution frames in a training set of frames.

The combiner 108 combines the output high resolution frame of the CNN 104 with the high resolution frame from the hardware scaler 106 to generate a combined high resolution frame 110. For example, the combined high resolution frame 110 may have improved detail as compared to the high resolution frame from the hardware scaler 106. Moreover, in various examples, the system 100 may use a scalable CNN super resolution framework that includes a hardware scaler 106 and scalable CNN 104, which can be extended as a quality requirement and computation capability increases. For example, the CNN 104 may be the scalable CNN 200 of FIG. 2.

The diagram of FIG. 1 is not intended to indicate that the example system 100 is to include all of the components shown in FIG. 1. Rather, the example system 100 can be implemented using fewer or additional components not illustrated in FIG. 1 (e.g., additional low resolution frames, high resolution frames, CNN networks, hardware scalers, etc.).

Figure 2:
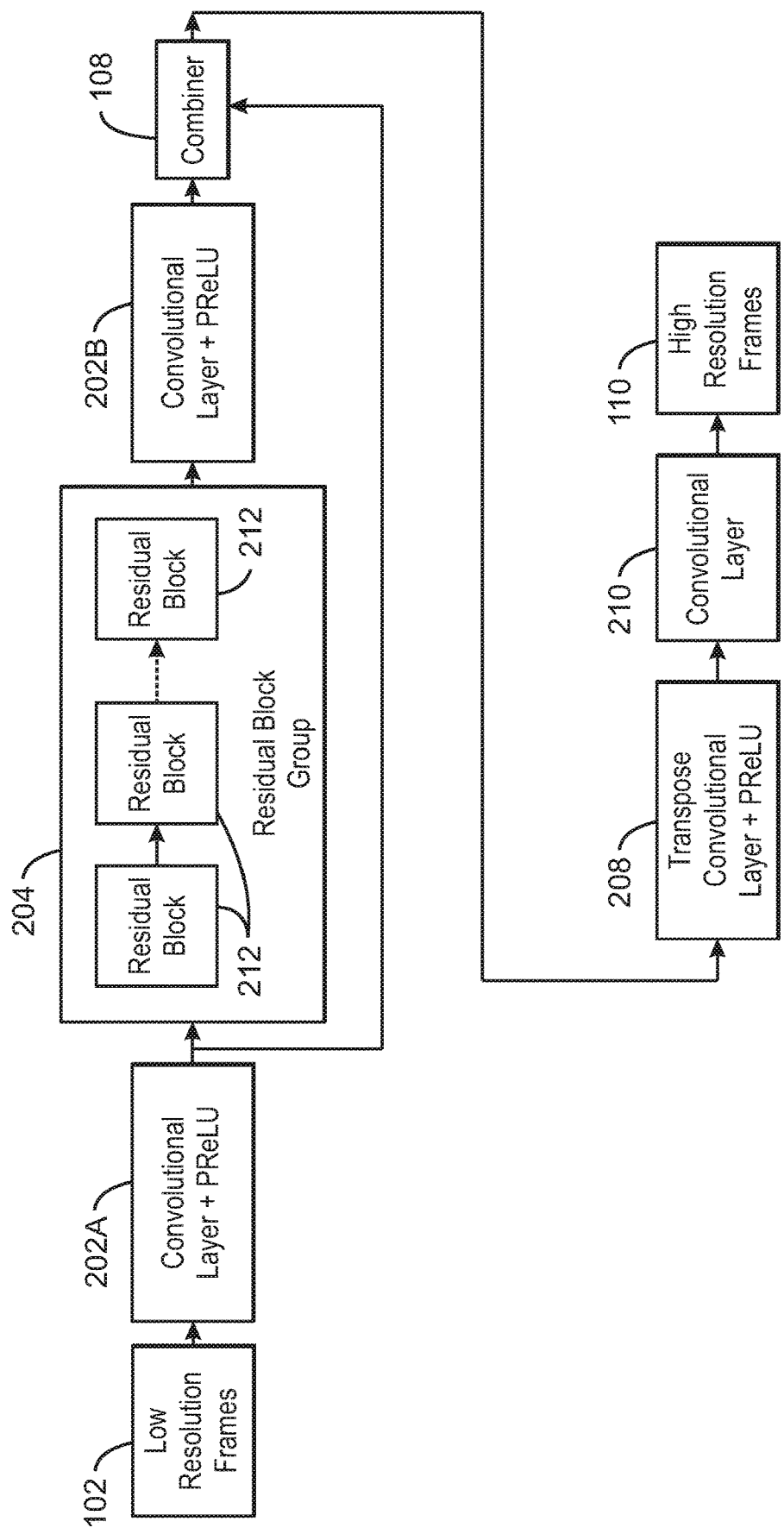
FIG. 2 is a block diagram illustrating an example scalable convolutional neural network for super resolution.

FIG. 2 is a block diagram illustrating an example scalable convolutional neural network for super resolution. The example scalable CNN 200 can be implemented in CNN 104 of the system 100 of FIG. 1, or the CNN 1038 of computing device 1000 in FIG. 10 using the methods 600-900 of FIGS. 6-9. For example, the scalable CNN 200 can be trained using the methods 600 and 700 of FIGS. 6 and 7 and used to generate high resolution frames using the methods 800 and 900 of FIGS. 8 and 9.

The example scalable CNN 200 includes similarly numbered elements of FIG. 1. For example, the scalable CNN 200 is shown receiving a low resolution frame 102 and outputting a high resolution frame 110. In some examples, in addition to YUV input frames 102, the scalable CNN network 200 can be configured to support native RGB input frames 102. In these examples, both training and inference may use images or video frames in RGB color space as input 102, and no hardware scaler is used. The scalable CNN 200 further includes a first convolutional layer 202A with PReLU activation. For example, the first convolutional layer 202A may have parameter values of (K,1,3,N), where K is the convolutional kernel size, the first "1" value refers to the number of strides to apply the convolution, the "3" value refers to the number of input channels, and N means the number of output channels or feature maps. As another example, if the first convolutional layer 202A is used in the CNN 104, the parameter values may be (K,1,1,N), where the single channel may be the Y component of a YUV video frame. The scalable CNN 200 includes a residual block group 204 communicatively coupled to the first convolutional layer 202A. The scalable CNN 200 further includes a second convolutional layer with PReLU activation 202B communicatively coupled to the residual block group 204. For example, the second convolutional layer 202B may have parameter values of (K,1,N,N), where the first "N" is a number of input feature maps and the second "N" value is the number of feature maps in a new output set of feature maps. For example, the convolutional layer 202B may have an input of N feature maps, and each feature map is a two-dimensional image patch. After the processing at the convolutional layer 202B, the convolutional layer 202B may output a new set of N feature maps, which are used to restore a high-resolution image or video. The system includes a combiner 108 communicatively coupled to the first convolutional layer 202A and the second convolutional layer 202B. The scalable CNN 200 also includes a transpose convolutional layer 208 with PReLU activation communicatively coupled to the combiner 108. For example, the transpose convolutional layer 208 may have parameter values of (K,1,N,N). In various examples, the transpose convolution layer 208 upscales the input N feature maps by an integer factor. For example, the transpose convolution layer 208 may upscale the input features by a factor of 2 for 2× upscaling case. As one examples, if the size of each input feature map is p, then the transpose convolution layer 208 may output a new set of N feature maps, and the size of each feature map is 2p. The scalable CNN 200 further includes a third convolutional layer 210 communicatively coupled to the transpose convolutional layer 208. For example, the third convolutional layer 210 may have (K,1,N,3) features. In some examples, such as if the scalable CNN 200 is used as the CNN 104, then the parameter set for the third convolutional layer 210 may be (K, 1, N, 1), because only one channel may be output by the network. For example, the one channel may be the Y component channel. The residual block group 204 includes a number of residual blocks 210. The use of a reduced number of residual blocks is 210 indicated by a dotted arrow. For example, the last residual block 210 of the residual block group 204 may not be used for operations with less computational complexity.

As shown in the example of FIG. 2, in various examples, a topology based on an enhanced deep super-resolution network (EDSR) structure may be deployed as a baseline framework for the scalable CNN 200. The EDSR structure may be optimized by having unnecessary modules removed in comparison to conventional residual networks. In various examples, the internal weight and activation precision of the scalable CNN 200 may be reduced. For example, the scalable CNN 200 may use 16-bit floating point representations instead of 32-bit in the original EDSR structure. In addition, in various examples, the number of residual blocks and feature dimensions may be pruned in order to achieve real time performance with limited computation capability and memory bandwidth in mobile platforms. For example, the pruning of residual blocks 210 to use a lower number of residual blocks 210 is indicated by a dotted arrow. The number of feature maps N used in convolutional layers 202A, 202B, 208, and 210 may also be reduced to reduce the feature dimensions of the scalable CNN 200. By reducing this number, the total computational resources and memory bandwidth can be effectively reduced. In some examples, the network feature map size may also be adaptive to the input resolution. For example, the capability of CNN network can be further increased with computational growth. For example, by cascading more residual blocks or increasing the number of feature maps N, the system can be extended to a larger network and provide higher quality results. Similarly, to reduce computational intensity, the capability of the CNN network 200 may be decreased by either reducing the number of residual blocks or the number of feature maps N used in convolutional layers 202A, 202B, 208, and 210. In some examples, to improve cache locality, the size of the feature maps may also be adjusted. As used herein, the feature map size refers to a size of the image patches. For example, the size of the image patches may be (W/M)×(H/N). As one example, when M=N=1, the feature map size may be equal to the low resolution image width W and height H. In the inference stage, each low-resolution image may be divided into M×N image patches, whose size is (W/M)×(H/N). In some examples, an optimal feature map size may be used to improve the cache locality to achieve best system performance. For example, an optimal feature map size may be determined by running an inference multiple times using different feature map sizes to determine which feature map size has the best performance. In some examples, if more detailed information on the architecture of the computation devices is available, then a theoretical performance projection can be performed using different feature map sizes to determine an optimal feature size value.

In addition, the ReLU function of the EDSR structure may be replaced with a PReLU function. For example, the PReLU function may be the PReLU function of FIG. 4.

The diagram of FIG. 2 is not intended to indicate that the example scalable CNN 200 is to include all of the components shown in FIG. 2. Rather, the example scalable CNN 200 can be implemented using fewer or additional components not illustrated in FIG. 2 (e.g., additional low resolution frame, high resolution frames, convolutional layers, residual blocks, etc.).

Figure 3:
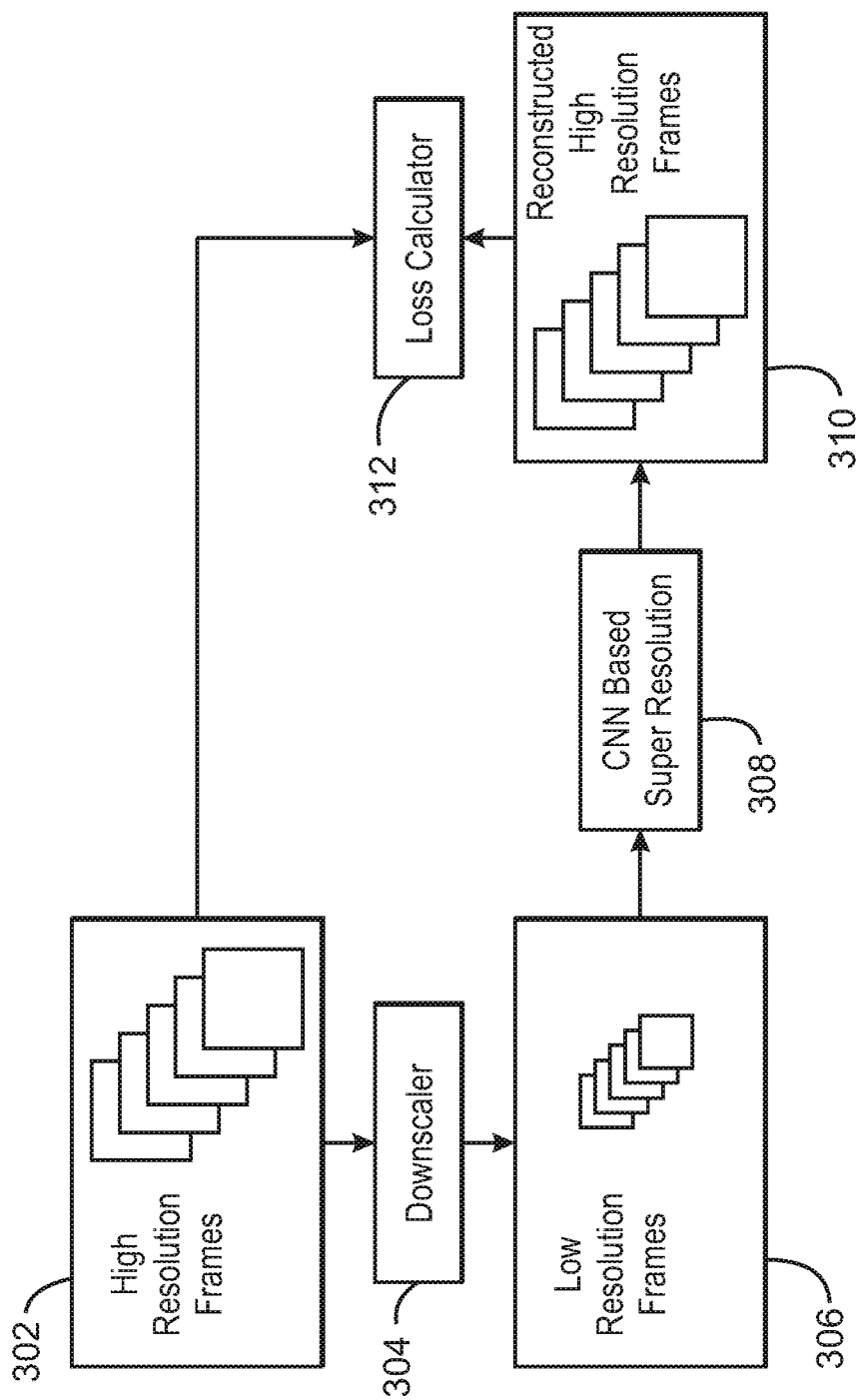
FIG. 3 is a flow chart illustrating an example system for training a scalable convolutional neural network for super resolution.

FIG. 3 is a flow chart illustrating an example system for training a scalable convolutional neural network for super resolution. The example system 300 can be implemented to train the system 100 or the scalable CNN 200 of FIGS. 1 and 2, using the computing device 1000 of FIG. 10, or the computer readable media 1100 of FIG. 11.

The system 300 of FIG. 3 includes a set of high resolution frames 302. For example, the high resolution frames 302 may be a set of training frames. The system 300 includes a downscaler 304. The system 300 includes low resolution frames 306 shown being output by the downscaler 302. The system 300 includes a CNN-based super resolution unit 308 communicatively coupled to the downscaler 304 to receive downscaled low resolution frames 306. The system 300 includes a set of reconstructed high resolution frames 310 shown being generated by the CNN-based super resolution unit 308. For example, the CNN based super resolution network 308 may be implemented using the scalable convolutional neural network 200 of FIG. 2. The system 300 also further includes a loss calculator 312 communicatively coupled to the CNN-based super resolution unit 308 and shown receiving both the high resolution frames 302 and the reconstructed high resolution frames 310.

The example system 300 for training a CNN-based super resolution unit 308 includes a first low resolution frame 306 and high resolution frame 302 pairs may be prepared before training. For example, a high resolution frame 310 may be captured by the device with higher sampling rate. In some examples, the high resolution frames 310 may be converted into YUV format from other image formats, such as RGB. In various examples, the downscaler 304 can generate low resolution frames 306 by downsampling high resolution frames 302. In various examples, the high resolution frames 302 may be downscaled using a nearest neighbor downsampling method for purposes of data augmentation. For example, the training data set may be first generated in traditional manner, then screen and gaming content may be resized using a nearest neighbor method. In various examples, a proportion of nearest neighbor downsampled frames among the total training set may be controlled. By using nearest downsampled frames for training input, the resulting trained CNN based super resolution network 308 may successfully be prevented from generating overshoot artifacts on text and edges at inference. However, some distortion may be introduced on text areas if nearest downsampled frames are exclusively used for training input. For example, the text areas may appear to have a changed font style. In addition, some sharp details may also be removed along the lines. Thus, only training with neighbor downscaled data may degrade the high resolution output quality. Therefore, in some examples, the proportion of nearest neighbor training frames may be optimized and set to be used within 10% to 25% among the total training frames. In this way, the trained model for the CNN-based super resolution network 308 may not be over tuned.

In various examples, the CNN-based super resolution network 308 receives the downscaled low resolution frames 306 and generates reconstructed high resolution frames 310. For example, the reconstructed high resolution frames 310 may match the resolution of the high resolution frames 302.

The reconstructed high resolution frames 310 may be input with the original high resolution frames 302 into a loss calculator 312 to calculate a loss to be minimized. For example, the loss may be calculated using any suitable loss function. In various examples, the loss function used for training can be designed as L1/L2 of the output and ground truth, or any other suitable perceptual loss. In some examples, a gradient of the loss function with respect to weights of the CNN may be calculated using backpropagation. One or more weights of the CNN may be updated accordingly. By minimizing the loss function between the generated reconstructed high resolution frames 310 and their corresponding ground truth high resolution frames 302, the CNN-based super resolution network 308 may finally converge to a certain degree. For example, the degree of convergence may be set as a predefined threshold.

In various examples, the resulting trained CNN-based super resolution network 308 may be used in an inference stage for improved super resolution imaging. For example, the trained CNN-based super resolution network 308 may be used as the system 100 of FIG. 1.

The diagram of FIG. 3 is not intended to indicate that the example system 300 is to include all of the components shown in FIG. 3. Rather, the example system 300 can be implemented using fewer or additional components not illustrated in FIG. 3 (e.g., additional high resolution frames, low resolution frames, reconstructed high resolution frames, downscalers, CNN based super resolution networks, losses, etc.). For example, the system 300 can also use the self-similarity loss and final loss of FIG. 5 by introducing a CNN based downsampler.

Figure 4:
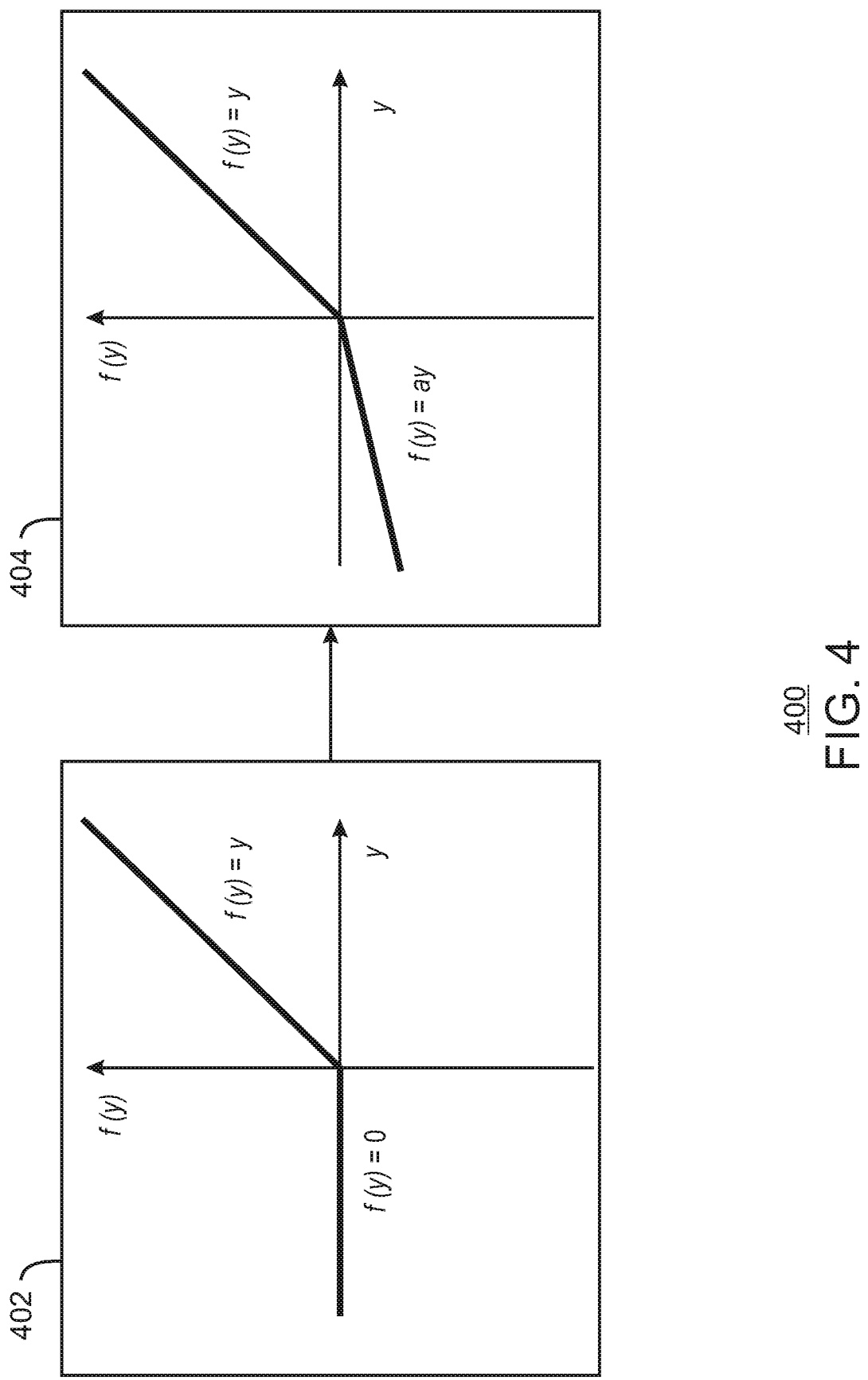
FIG. 4 is a pair of graphs showing a replacement of a ReLU activation function with a PReLU activation function.

FIG. 4 is a pair of graphs 400 showing a replacement of a ReLU activation 402 function with a PReLU activation function 404. The vertical axes of the graphs indicate values for f(y) and the horizontal axes indicate values of y. In some examples, because the ReLU activation 402 may clamp the outputs y below zero to an f(y) value of zero, this may result in gradient vanishing during training. In particular, for y<0, the gradient of ReLU equals to 0, which means that gradient backpropagation may stop at this point, and all the layers before the ReLU may not be well optimized by the training. Thus, to improve training and resulting output quality, the ReLU activation 402 may be replaced with a PReLU activation 404. For example, a quality improvement when using PReLU 404 may be particularly noticeable at inference with frames including sharp edges, such as text. Some types of content, such as screen content, may include sharp edges more often. Together with the data augmentation techniques described in FIG. 3, a model trained using a PReLU activation 404 may remove overshoot artifacts on screen and gaming content, while preserving sharpness in nature content.

Figure 5:
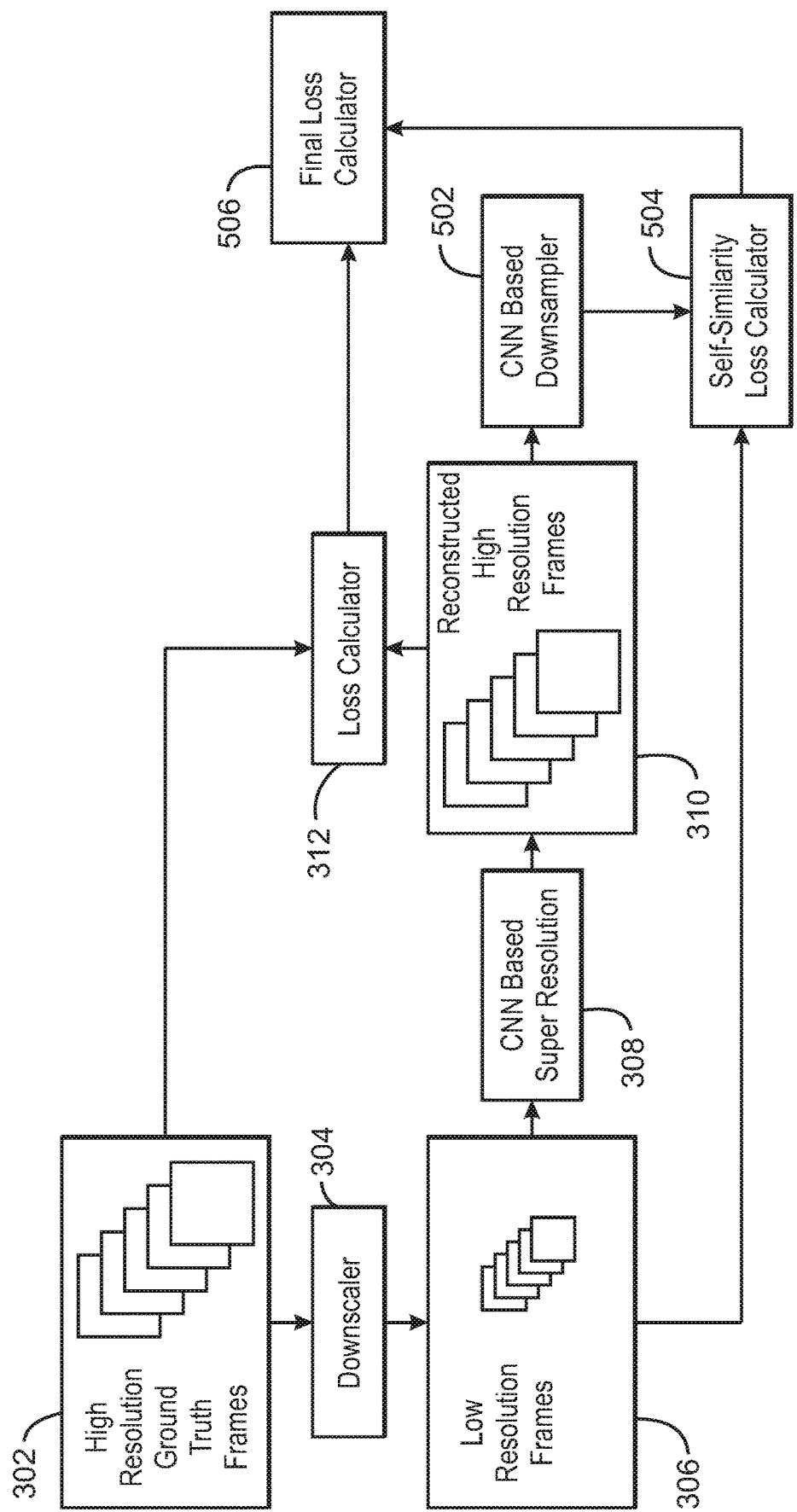
FIG. 5 is a block diagram illustrating an example system for training a scalable convolutional neural network for super resolution with a self-similarity loss.

FIG. 5 is a block diagram illustrating an example system for training a scalable convolutional neural network for super resolution with a self-similarity loss. The example system 500 can be implemented to train the system 100 or the scalable CNN 200 of FIGS. 1 and 2, the computing device 1000 of FIG. 10, or the computer readable media 1100 of FIG. 11.

The system 500 of FIG. 5 includes similarly numbered elements of the system 300 of FIG. 3. In addition, the system 500 includes a CNN based downscaler 502 communicatively coupled to the CNN based super resolution network 308. In various examples, the CNN based downscaler 502 may have the same topology as the example scalable convolutional neural network 200 of FIG. 2, but with parameters configured differently to enable downscaling. In addition, the system 500 also includes a self-similarity loss calculator 504 communicatively coupled to the CNN-based downsampler 502. The system 500 also further includes a final loss calculator 506 communicatively coupled to the self-similarity loss calculator 504 and the loss calculator 312.

In the system 500, the CNN based downscaler 502 can perform downsampling on the reconstructed high resolution frames 310 to generate downsampled reconstructed high resolution frames with a low resolution referred to herein as CNN based downsampled frames. For example, the CNN based downsampled frames may have a resolution similar to the low resolution frames 306.

The self-similarity loss calculator 504 can calculate a self-similarity loss based on the low resolution frames 306 and the CNN based downsampled frames. In various examples, the self-similarity loss measures the similarity between the downscaled input frame and a downscaled copy of the reconstructed high resolution frame 310. In various examples, the self-similarity loss can be used to regularize the CNN-network to suppress aliasing artifact via backpropagation.

The final loss calculator 506 can calculate a final loss based on the loss 312 and the self-similarity loss 504. For example, the final loss may be calculated by the weighted average of loss 312 and self-similarity loss 504. For example, the final loss may be calculated using the Equation:

$$\text{Final}_{loss} = \text{loss}_A + \lambda * \text{self\_similarity\_loss} \qquad \text{Eqn. 1}$$

where $\text{loss}_A$ is the loss calculated by loss calculator 312, self_similarity_loss is the loss calculated by the self-similarity loss calculator 504, and lambda is an empirically determined weighting parameter. Thus, the aliasing artifacts may be suppressed by using the final loss in the network optimization. Because the CNN based downsampler 502 is only used during training and not used during inference, the resulting system using the trained CNN based super resolution network 308 may be computationally very efficient at inference.

The diagram of FIG. 5 is not intended to indicate that the example system 500 is to include all of the components shown in FIG. 5. Rather, the example system 500 can be implemented using fewer or additional components not illustrated in FIG. 5 (e.g., additional high resolution ground truth frames, low resolution frames, high resolution frames, CNN networks, hardware scalers, etc.).

Figure 6:
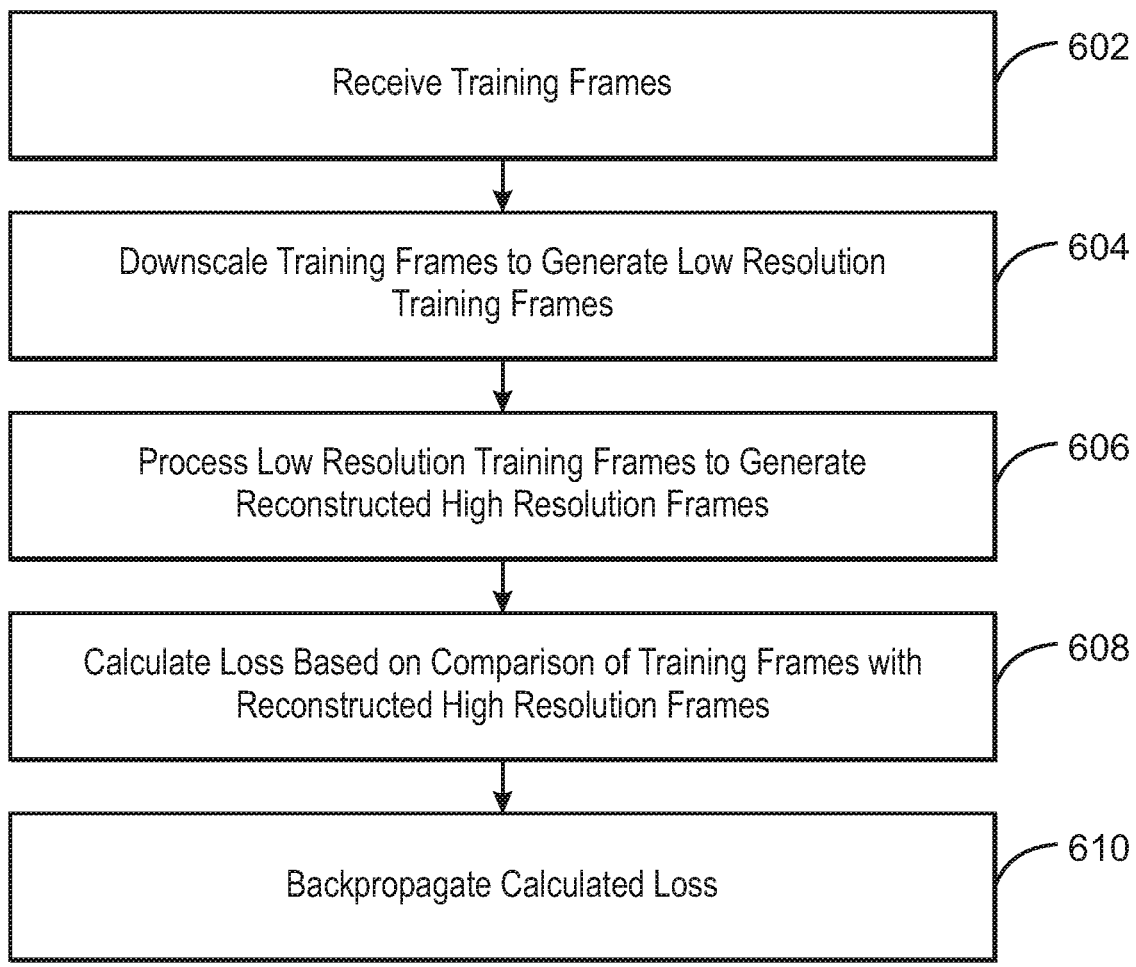
FIG. 6 is a process flow diagram illustrating a method for training a scalable convolutional neural network for super resolution.

FIG. 6 is a process flow diagram illustrating a method 600 for training a scalable convolutional neural network for super resolution. The example method 600 can be implemented in the systems 100 and 200 of FIGS. 1 and 2, the computing device 1000 of FIG. 10, or the computer readable media 1100 of FIG. 11.

At block 602, training frames are received. For example, the training frames may be high resolution frames used as ground truth frames. In various examples, the training frames may be frames in a YUV format.

At block 604, the training frames are downscaled to generate low resolution training frames. For example, the training frames may be downscaled by a factor of two in each direction. Thus, each block of four pixels may be represented by one pixel in the low resolution training frames. In various examples, the training frames may be downscaled using nearest neighbor downscaling. In some examples, the training frames may include base part and an augmented part. The base part may be a low resolution frame generated by using bicubic interpolation. The augmented part may be a low resolution frame was generated by using nearest neighbor downscaling. In various examples, the percentage of augmented parts to the total sum of parts may be 10%-25%. May I know whether we need to emphasis these two parts here At block 606, the low resolution training frames are processed via the scalable convolutional neural network to generate reconstructed high resolution frames. For example, the reconstructed high resolution frames may have the same resolution as the high resolution training frames.

At block 608, a loss is calculated based on a comparison of the training frames with the reconstructed high resolution frames. For example, the loss may be a L1/L2 loss or any other suitable perceptual loss.

At block 610, the calculated loss is backpropagated. For example, one or more weights of the scalable convolutional neural network may be adjusted based on the calculated loss.

The process flow diagram of FIG. 6 is not intended to indicate that the blocks of the example method 600 are to be executed in any particular order, or that all of the blocks are to be included in every case. Further, any number of additional blocks not shown may be included within the example method 600, depending on the details of the specific implementation.

Figure 7:
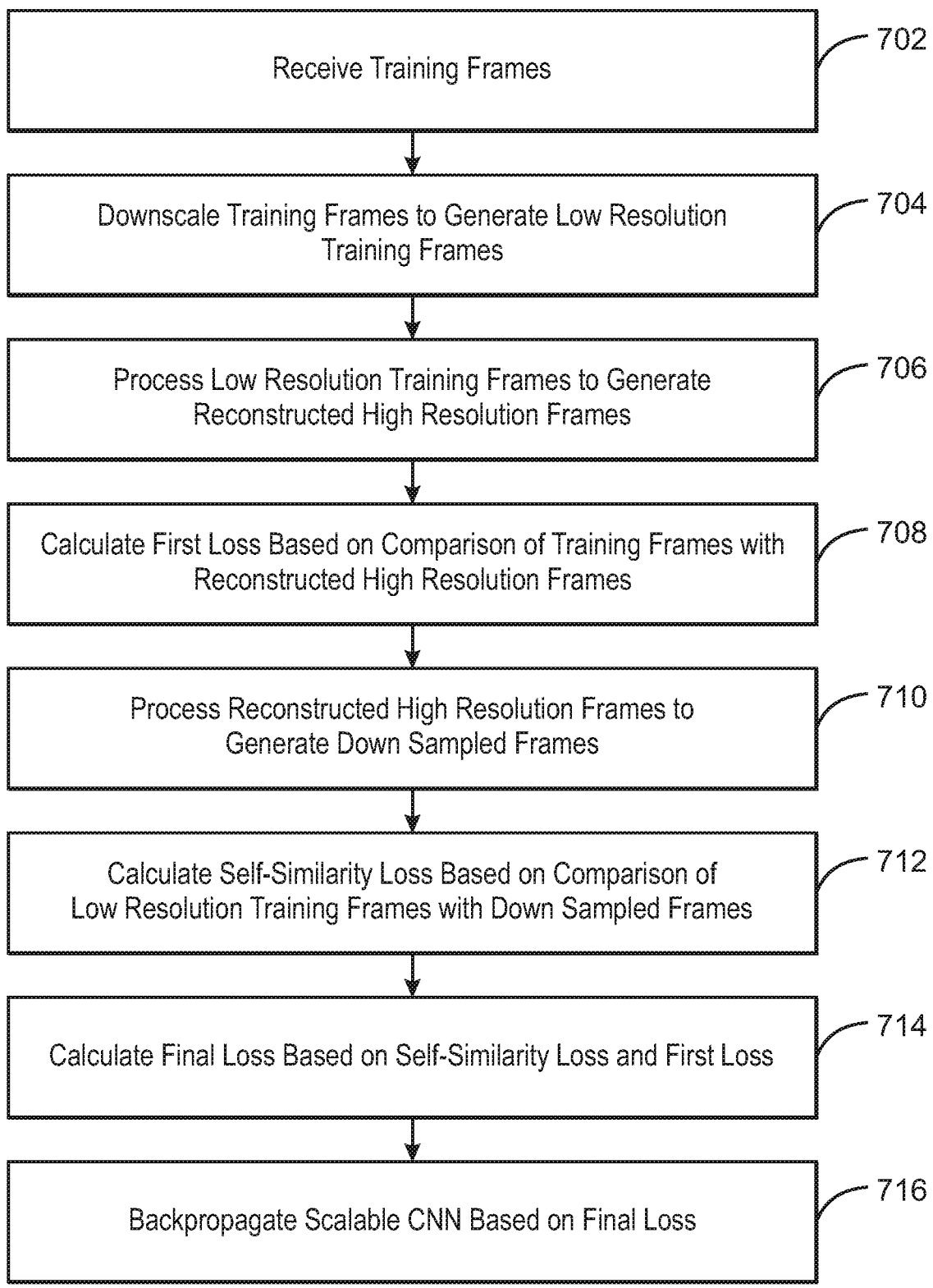
FIG. 7 is a process flow diagram illustrating a method for training a scalable convolutional neural network for super resolution with a self-similarity loss.

FIG. 7 is a process flow diagram illustrating a method 700 for training a scalable convolutional neural network for super resolution with a self-similarity loss. The example method 700 can be implemented in the systems 100 and 200 of FIGS. 1 and 2, the computing device 1000 of FIG. 10, or the computer readable media 1100 of FIG. 11.

At block 702, training frames are received. For example, the training frames may be high resolution color frames or video frames. In various examples, the training frames may be video frames in a YUV format. For example, the convolutional neural network may be configured to receive the Y channel of the YUV format video frames. In some examples, the training frames may be in an RGB format. For example, the scalable convolutional neural network may be configured to support three channel input without the use of a scaler.

At block 704, the training frames are downscaled to generate low resolution training frames. For example, the training frames may be downscaled by a factor of two in each direction. In various examples, the training frames may be downscaled using nearest neighbor downscaling.

At block 706, the low resolution training frames are processed via the scalable convolutional neural network to generate reconstructed high resolution frames. For example, the reconstructed high resolution frames may have the same resolution as the high resolution training frames.

At block 708, a first loss is calculated based on a comparison of the training frames with the reconstructed high resolution frames. For example, the loss may be a L1/L2 loss or any other suitable perceptual loss.

At block 710, the reconstructed high resolution frames are processed to generate downsampled frames. For example, the reconstructed high resolution frames may be downsampled using a CNN based downsampler.

At block 712, a self-similarity loss is calculated based on a comparison of the low resolution training frames with the downsampled frames. For example, the self-similarity loss may be calculated using a L1/L2 loss or any other suitable perceptual loss.

At block 714, a final loss is calculated based on the self-similarity loss and the first loss. For example, the final loss may be calculated by combining the self-similarity loss with the first loss.

At block 716, the final loss is backpropagated through the scalable convolutional neural network. For example, one or more weights of the scalable convolutional neural network may be adjusted based on the calculated loss.

The process flow diagram of FIG. 7 is not intended to indicate that the blocks of the example method 700 are to be executed in any particular order, or that all of the blocks are to be included in every case. Further, any number of additional blocks not shown may be included within the example method 700, depending on the details of the specific implementation.

Figure 8:
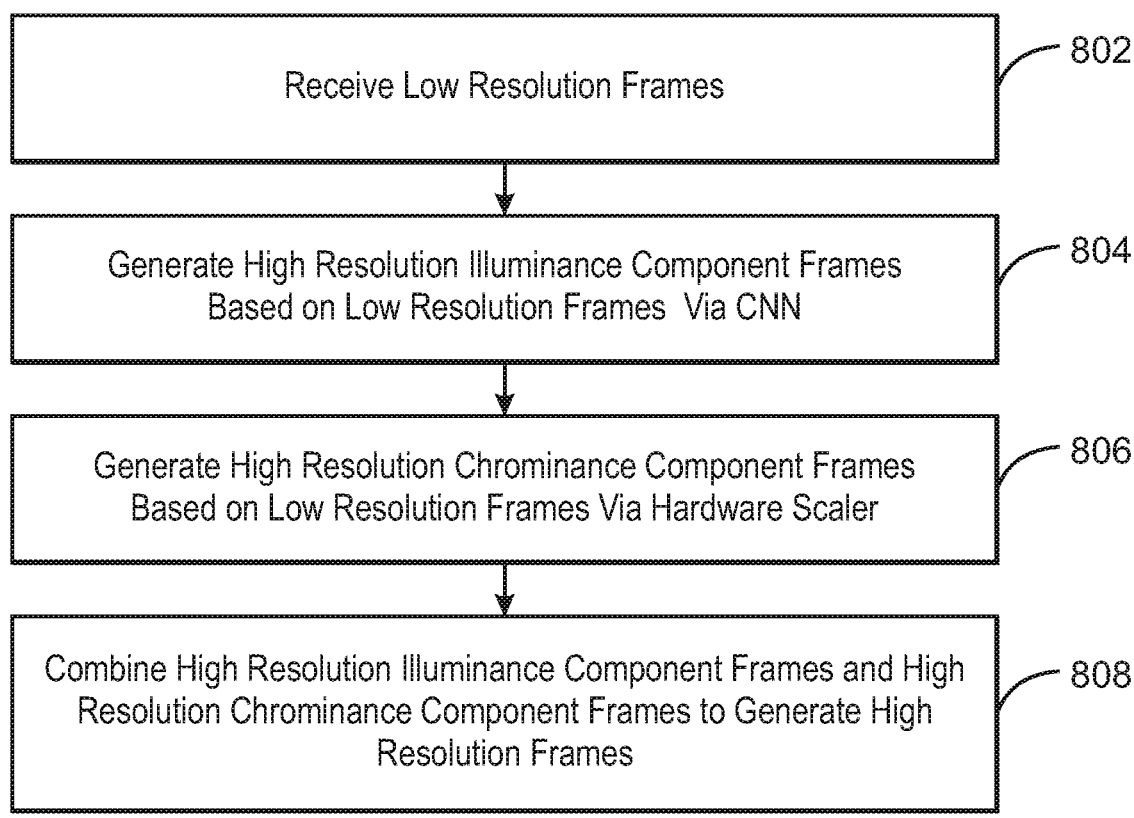
FIG. 8 is a process flow diagram illustrating a method for super resolution using a scalable neural network.

FIG. 8 is a process flow diagram illustrating a method 800 for super resolution using a scalable neural network. The example method 800 can be implemented in the systems 100 and 200 of FIGS. 1 and 2, the computing device 1000 of FIG. 10, or the computer readable media 1100 of FIG. 11.

At block 802, low resolution frames are received. For example, the low resolution video frames may be in a YUV video frame format. In some examples, the low resolution frames may be converted into the YUV frame format from an RGB format.

At block 804, high resolution illuminance component frames are generated based on the low resolution frames via a convolutional neural network (CNN). For example, the high resolution illuminance component frames may be generated based on an illuminance component of the low resolution frames. In some examples, the CNN may be the scalable CNN of FIG. 2. In various examples, the CNN may be trained using nearest neighbor downsampling of high resolution ground truth training frames. In some examples, the CNN may be trained using a self-similarity loss function. For example, the CNN may be trained using the methods 600 or 700 of FIGS. 6 and 7. In some examples, the CNN may include a reduced residual block group. In various example, the CNN may also include a parametric rectified linear unit (PReLU) activation.

At block 806, high resolution chrominance component frames are generated based on the low resolution frames via a hardware scaler. For example, the high resolution illuminance component frames may be generated based on chrominance components of the low resolution frames. In various examples, the hardware scaler may be an energy efficient hardware scaler.

At block 808, the high resolution illuminance component frames are combined with the high resolution chrominance component frames to generate high resolution frames. For example, a high resolution illuminance component frame may be combined with a high resolution chrominance component frame to generate a high resolution YUV format video frame.

The process flow diagram of FIG. 8 is not intended to indicate that the blocks of the example method 800 are to be executed in any particular order, or that all of the blocks are to be included in every case. Further, any number of additional blocks not shown may be included within the example method 800, depending on the details of the specific implementation. For example, the method 800 may include adapting a feature map size of the convolutional neural network to a resolution of the low resolution frame. In some examples, the method 800 may include adjusting the number of feature maps in the convolutional neural network based on a memory bandwidth available to the processor.

Figure 9:
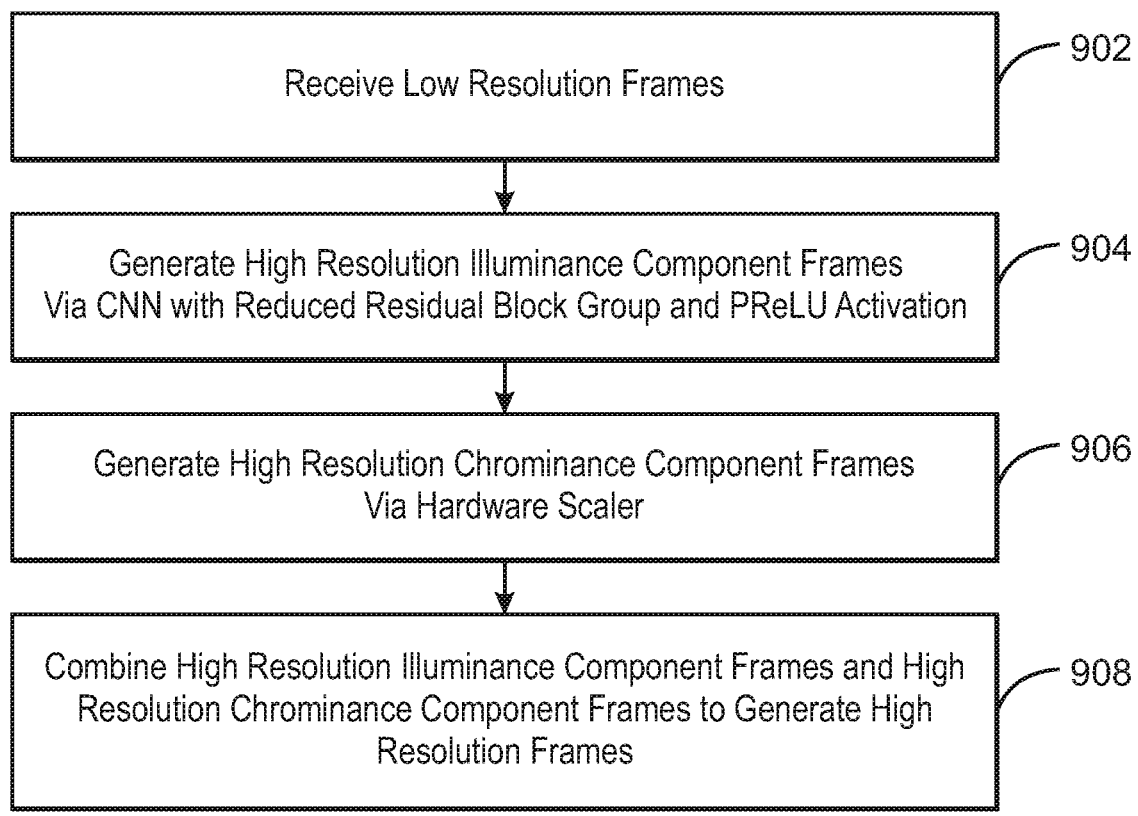
FIG. 9 is a process flow diagram illustrating a method for super resolution using a scalable neural network with PReLU activation.

FIG. 9 is a process flow diagram illustrating a method 900 for super resolution using a scalable neural network with PReLU activation. The example method 900 can be implemented in the systems 100 and 200 of FIGS. 1 and 2, the computing device 1000 of FIG. 10, or the computer readable media 1100 of FIG. 11.

At block 902, low resolution frames are received. For example, the low resolution frames may be received in a YUV video frame format. In some examples, the frames may be received in an RGB format and converted into a YUV frame format.

At block 904, high resolution frames are generated via a convolutional neural network (CNN) with a PReLU activation. For example, the high resolution illuminance component frames may be generated based on an illuminance component of the low resolution frames. In some examples, the CNN may be the scalable CNN of FIG. 2.

At block 906, high resolution frames are generated via a hardware scaler with residual block group and PReLU activation. For example, the high resolution illuminance component frames may be generated based on chrominance components of the low resolution frames. In various examples, the hardware scaler may be an energy efficient hardware scaler.

At block 908, the high resolution frames of the CNN are combined with the high resolution frames of the hardware scaler to generate combined high resolution frames. For example, a high resolution illuminance component frame may be combined with a high resolution chrominance component frame to generate a high resolution YUV format frame.

The process flow diagram of FIG. 9 is not intended to indicate that the blocks of the example method 900 are to be executed in any particular order, or that all of the blocks are to be included in every case. Further, any number of additional blocks not shown may be included within the example method 900, depending on the details of the specific implementation. For example, the method 900 may include adapting a feature map size of the convolutional neural network to a resolution of the low resolution frame, adjusting the number of feature maps in the convolutional neural network based on a memory bandwidth available to the processor, or both.

Figure 10:
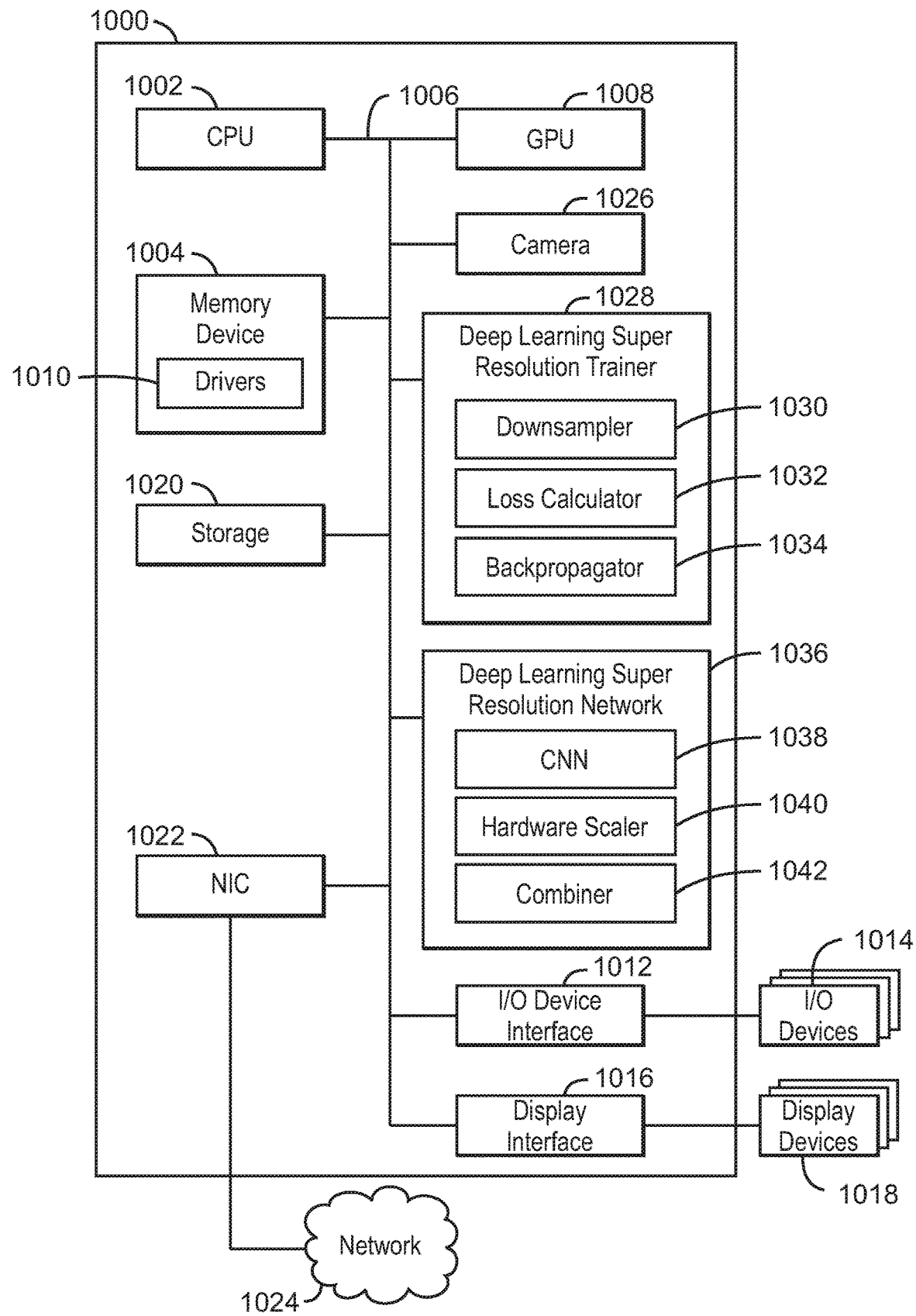
FIG. 10 is block diagram illustrating an example computing device that can execute super resolution using a scalable neural network.

Referring now to FIG. 10, a block diagram is shown illustrating an example computing device that can execute super resolution using a scalable neural network. The computing device 1000 may be, for example, a laptop computer, desktop computer, tablet computer, mobile device, or wearable device, among others. In some examples, the computing device 1000 may be an edge device in a cloud computing system. In various examples, the computing device 1000 may be a camera system. The computing device 1000 may include a central processing unit (CPU) 1002 that is configured to execute stored instructions, as well as a memory device 1004 that stores instructions that are executable by the CPU 1002. The CPU 1002 may be coupled to the memory device 1004 by a bus 1006. Additionally, the CPU 1002 can be a single core processor, a multi-core processor, a computing cluster, or any number of other configurations. Furthermore, the computing device 1000 may include more than one CPU 1002. In some examples, the CPU 1002 may be a system-on-chip (SoC) with a multi-core processor architecture. In some examples, the CPU 1002 can be a specialized digital signal processor (DSP) used for video processing. The memory device 1004 can include random access memory (RAM), read only memory (ROM), flash memory, or any other suitable memory systems. For example, the memory device 1004 may include dynamic random access memory (DRAM).

The memory device 1004 can include random access memory (RAM), read only memory (ROM), flash memory, or any other suitable memory systems. For example, the memory device 1004 may include dynamic random access memory (DRAM).

The computing device 1000 may also include a graphics processing unit (GPU) 1008. As shown, the CPU 1002 may be coupled through the bus 1006 to the GPU 1008. The GPU 1008 may be configured to perform any number of graphics operations within the computing device 1000. For example, the GPU 1008 may be configured to render or manipulate graphics images, graphics frames, videos, or the like, to be displayed to a user of the computing device 1000.

The memory device 1004 can include random access memory (RAM), read only memory (ROM), flash memory, or any other suitable memory systems. For example, the memory device 1004 may include dynamic random access memory (DRAM). The memory device 1004 may include device drivers 1010 that are configured to execute the instructions for training multiple convolutional neural networks to perform sequence independent processing. The device drivers 1010 may be software, an application program, application code, or the like.

The CPU 1002 may also be connected through the bus 1006 to an input/output (I/O) device interface 1012 configured to connect the computing device 1000 to one or more I/O devices 1014. The I/O devices 1014 may include, for example, a keyboard and a pointing device, wherein the pointing device may include a touchpad or a touchscreen, among others. The I/O devices 1014 may be built-in components of the computing device 1000, or may be devices that are externally connected to the computing device 1000. In some examples, the memory 1004 may be communicatively coupled to I/O devices 1014 through direct memory access (DMA).

The CPU 1002 may also be linked through the bus 1006 to a display interface 1016 configured to connect the computing device 1000 to a display device 1018. The display device 1018 may include a display screen that is a built-in component of the computing device 1000. The display device 1018 may also include a computer monitor, television, or projector, among others, that is internal to or externally connected to the computing device 1000.

The computing device 1000 also includes a storage device 1020. The storage device 1020 is a physical memory such as a hard drive, an optical drive, a thumbdrive, an array of drives, a solid-state drive, or any combinations thereof. The storage device 1020 may also include remote storage drives.

The computing device 1000 may also include a network interface controller (NIC) 1022. The NIC 1022 may be configured to connect the computing device 1000 through the bus 1006 to a network 1024. The network 1024 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 1000 further includes a camera 1026. For example, the camera 1026 may include one or more imaging sensors. In some example, the camera 1026 may include a processor to generate video frames.

The computing device 1000 further includes a deep learning super resolution trainer 1028. For example, the deep learning super resolution trainer 1028 can be used to train a neural network to perform super-resolution imaging. The deep learning super resolution trainer 1028 can include a downsampler 1030, a loss calculator 1032, and a backpropagator 1034. In some examples, each of the components 1030-1034 of the deep learning super resolution trainer 1028 may be a microcontroller, embedded processor, or software module. The downsampler 1030 can downscale high resolution training frames to generate additional training pairs including base parts and augmented parts. For example, the downsampler 1030 can downscale training frames using a bicubic downsampling to generate a base part of each of the training frame pairs. In various examples, the downsampler 1030 can downscale training frames using nearest neighbor downsampling of high resolution ground truth training frames to generate an augmented part of each training frame pair. In various examples, the additional training pairs including the base parts and augmented parts may be 10 to 25 percent of the training dataset used. For example, the use of 10-25% of additional training pairs during training may regularize the network and improve the quality of the trained network. The loss calculator 1032 can calculate a loss based on a comparison of reconstructed high resolution frames and high resolution ground truth frames. For example, a convolutional neural network may be used to generate reconstructed high resolution frame from a low resolution training frame during training. In some examples, the loss calculator 1032 can calculate a self-similarity loss based on a comparison of a downsample reconstructed high resolution frame and a downsampled low resolution frame. For example, the loss calculator 1032 can calculate a self-similarity loss based on a CNN based downsampled frame generated from a reconstructed high resolution frame and a low resolution training frame generated by downscaling a high resolution ground truth frame. In various examples, the loss calculator 1032 can calculate a final loss based on the first loss and the self-similarity loss. For example, loss calculator 1032 can calculate a final loss by combining the first loss and the self-similarity loss. The backpropagator 1034 can backpropagate a loss to modify one or more weights of a CNN based super resolution network. In some examples, the backpropagator 1034 can backpropagate the final loss to modify one or more weights of a CNN based super resolution network.

The computing device also further includes a deep learning super resolution network 1036. For example, the deep learning super resolution network 1036 may be a scalable convolutional neural network. The deep learning super resolution network 1036 can be used to execute super resolution on input frames to generate frames with higher resolution and detail. The deep learning super resolution network 1036 includes a convolutional neural network 1038, a hardware scaler 1040, and a combiner 1042. The convolutional neural network 1038 can receive a low resolution frames and generate a high resolution illuminance component frames. For example, the convolutional neural network 1038 may be a small scale network based on enhanced deep superresolution. In some examples, the convolutional neural network 1038 may include a parametric rectified linear unit (PReLU) activation. In various examples, the convolutional neural network 1038 may include a feature map size that is optimized to improve cache locality. The hardware scaler 1040 can receive the low resolution frames and generate a high resolution chrominance component frames. The combiner 1042 can combine the high resolution illuminance component frames and the high resolution chrominance component frames to generate high resolution frames. For example, the combined high resolution images may have improved detail in the illuminance component most noticeably by human vision.

The block diagram of FIG. 10 is not intended to indicate that the computing device 1000 is to include all of the components shown in FIG. 10. Rather, the computing device 1000 can include fewer or additional components not illustrated in FIG. 10, such as additional buffers, additional processors, additional CNNs, and the like. The computing device 1000 may include any number of additional components not shown in FIG. 10, depending on the details of the specific implementation. For example, the deep learning super resolution trainer 1028 may further include a CNN based downsampler to downsample a reconstructed high resolution frame for training the convolutional neural network. Furthermore, any of the functionalities of the nearest neighbor downsampler 1030, the loss calculator 1032, and the backpropagator 1034, or the CNN 1038, the hardware scaler 1040, or combiner 1042, may be partially, or entirely, implemented in hardware and/or in the processor 1002. For example, the functionality may be implemented with an application specific integrated circuit, in logic implemented in the processor 1002, or in any other device. In addition, any of the functionalities of the CPU 1002 may be partially, or entirely, implemented in hardware and/or in a processor. For example, the functionality of the deep learning super resolution trainer 1028 or the deep learning super resolution network 1036 may be implemented with an application specific integrated circuit, in logic implemented in a processor, in logic implemented in a specialized graphics processing unit such as the GPU 1008, or in any other device.

Figure 11:
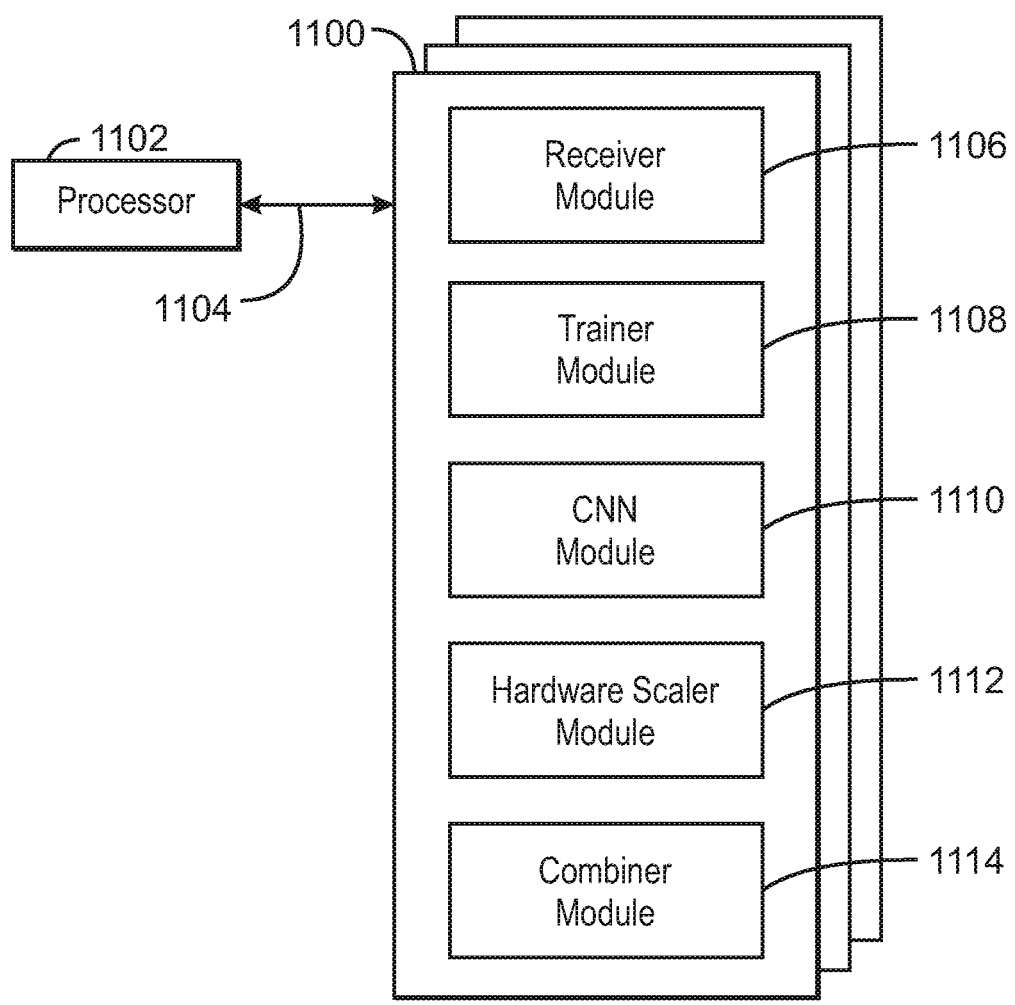
FIG. 11 is a block diagram showing computer readable media that store code for performing super resolution using a scalable neural network.

FIG. 11 is a block diagram showing computer readable media 1100 that store code for performing super resolution using a scalable neural network. The computer readable media 1100 may be accessed by a processor 1102 over a computer bus 1104. Furthermore, the computer readable medium 1100 may include code configured to direct the processor 1102 to perform the methods described herein. In some embodiments, the computer readable media 1100 may be non-transitory computer readable media. In some examples, the computer readable media 1100 may be storage media.

The various software components discussed herein may be stored on one or more computer readable media 1100, as indicated in FIG. 11. For example, a receiver module 1106 may be configured to receive low resolution frames. A trainer module 1108 may be configured to receiving high resolution ground truth training frames and train a CNN based on the training frames. For example, the trainer module 1108 may be configured to downscale the training frames to generate low resolution training frames to train the CNN. In some examples, the trainer module 1108 may be configured to downscale the training frames using nearest neighbor downsampling of the high resolution ground truth training frames. The trainer module 1108 may be configured to calculate a first loss based on a comparison of the training frames with reconstructed high resolution frames from the CNN. In some examples, the trainer module 1108 may be configured to process reconstructed high resolution frames to generate downsampled frames. In various examples, the trainer module 1108 may be configured to calculate a self-similarity loss based on a comparison of the low resolution training frames with the downsampled frames. For example, the trainer module 1108 may be configured to perform the methods 600 or 700 of FIGS. 6 and 7. A CNN module 1110 may be configured to generate high resolution illuminance component frames based on the low resolution frame. In some examples, the CNN module 1110 may be configured with a reduced residual block group. In various examples, the CNN module 1110 may be configured to include a parametric rectified linear unit (PReLU) activation. In some examples, the CNN module 1110 may be configured with an adaptable feature map size to match a resolution of the low resolution frame. In various examples, the CNN module 1110 may be configured with an adjustable number of feature maps based on a memory bandwidth available to a processor. A hardware scaler module 1112 may be configured to generate high resolution chrominance component frames based on the received low resolution frames. For example, the hardware scaler module 1112 may be configured to upscale the chrominance channels of the low resolution frames. A combiner module 1114 may be configured to combine the high resolution illuminance component frames of the CNN module 1110 with the high resolution chrominance component frames from the hardware scaler module 1112 to generate high resolution frames. For example, the combined high resolution frames may be YUV frames that include improved detail in the illuminance component.

The block diagram of FIG. 11 is not intended to indicate that the computer readable media 1100 is to include all of the components shown in FIG. 11. Further, the computer readable media 1100 may include any number of additional components not shown in FIG. 11, depending on the details of the specific implementation.

EXAMPLES

Example 1 is an apparatus for super resolution imaging. The apparatus includes a convolutional neural network to receive a low resolution frame and generate a high resolution illuminance component frame. The apparatus also includes a hardware scaler to receive the low resolution frame and generate a high resolution chrominance component frame. The apparatus further includes a combiner to combine the high resolution illuminance component frame and the high resolution chrominance component frame to generate a high resolution frame.

Example 2 includes the apparatus of example 1, including or excluding optional features. In this example, the convolutional neural network is trained on additional training frame pairs generated including augmented parts generated using nearest neighbor downsampling of high resolution ground truth training frames.

Example 3 includes the apparatus of any one of examples 1 to 2, including or excluding optional features. In this example, the convolutional neural network is trained using a self-similarity loss function.

Example 4 includes the apparatus of any one of examples 1 to 3, including or excluding optional features. In this example, the convolutional neural network includes a small scale network based on enhanced deep super-resolution.

Example 5 includes the apparatus of any one of examples 1 to 4, including or excluding optional features. In this example, the convolutional neural network includes a parametric rectified linear unit (PReLU) activation.

Example 6 includes the apparatus of any one of examples 1 to 5, including or excluding optional features. In this example, the convolutional neural network is to generate reconstructed high resolution frame from a low resolution training frame during training. The reconstructed high resolution frame and a ground truth high resolution frame are used to calculate a loss used to train the convolutional neural network.

Example 7 includes the apparatus of any one of examples 1 to 6, including or excluding optional features. In this example, the apparatus includes a CNN based downsampler to downsample a reconstructed high resolution frame for training the convolutional neural network.

Example 8 includes the apparatus of any one of examples 1 to 7, including or excluding optional features. In this example, the apparatus includes a self-similarity loss calculator to calculate a self-similarity loss based on a CNN based downsampled frame generated from a reconstructed high resolution frame and a low resolution training frame generated by downscaling a high resolution ground truth frame.

Example 9 includes the apparatus of any one of examples 1 to 8, including or excluding optional features. In this example, the apparatus includes a final loss calculator to calculate a final loss based on a loss and a self-similarity loss, the final loss used to train the convolutional neural network during training.

Example 10 includes the apparatus of any one of examples 1 to 9, including or excluding optional features. In this example, a feature map size of the convolutional neural network is optimized to improve cache locality.

Example 11 is a method for super resolution imaging. The method includes receiving, via a processor, a low resolution frame. The method also includes generating, via a convolutional neural network (CNN), a high resolution illuminance component frame based on the low resolution frame. The method further includes generating, via a hardware scaler, a high resolution chrominance component frame based on the low resolution frame. The method also further includes combining, via the processor, the high resolution illuminance component frame and the high resolution chrominance component frame to generate a high resolution frame.

Example 12 includes the method of example 11, including or excluding optional features. In this example, the method includes training the convolutional neural network using nearest neighbor downsampling of high resolution ground truth training frames.

Example 13 includes the method of any one of examples 11 to 12, including or excluding optional features. In this example, the method includes training the convolutional neural network using a self-similarity loss function.

Example 14 includes the method of any one of examples 11 to 13, including or excluding optional features. In this example, generating the high resolution illuminance component frame includes using a CNN with a reduced residual block group.

Example 15 includes the method of any one of examples 11 to 14, including or excluding optional features. In this example, generating the high resolution illuminance component frame includes using a CNN with a parametric rectified linear unit (PReLU) activation.

Example 16 includes the method of any one of examples 11 to 15, including or excluding optional features. In this example, the method includes adapting a feature map size of the convolutional neural network to a resolution of the low resolution frame.

Example 17 includes the method of any one of examples 11 to 16, including or excluding optional features. In this example, the method includes adjusting a number of feature maps in the convolutional neural network based on a memory bandwidth available to the processor.

Example 18 includes the method of any one of examples 11 to 17, including or excluding optional features. In this example, the method includes training the convolutional neural network. Training the convolutional neural network includes receiving training frames. Training the convolutional neural network includes downscaling, via a downscaler, the training frames to generate low resolution training frames. Training the convolutional neural network also includes processing, via the convolutional neural network, the low resolution training frames to generate reconstructed high resolution frames. Training the convolutional neural network further includes calculating a loss based on a comparison of the training frames with the reconstructed high resolution frames. Training the convolutional neural network also further includes and backpropagating the calculated loss.

Example 19 includes the method of any one of examples 11 to 18, including or excluding optional features. In this example, the method includes training the convolutional neural network. Training the convolutional neural network includes processing, via a CNN based downsampler, reconstructed high resolution frames to generate downsampled frames. Training the convolutional neural network also includes calculating a self-similarity loss based on a comparison of low resolution training frames with the downsampled frames. Training the convolutional neural network further includes calculating a final loss based on the self-similarity loss and a loss calculated between high resolution training frames and the reconstructed high resolution frames. Training the convolutional neural network also further includes backpropagating the convolutional neural network based on the calculated final loss.

Example 20 includes the method of any one of examples 11 to 19, including or excluding optional features. In this example, the method includes receiving an RGB component frame and converting the RGB color frame into a YUV component frame.

Example 21 is at least one computer readable medium for super resolution imaging having instructions stored therein that direct the processor to receive a low resolution frame. The computer-readable medium also includes instructions that direct the processor to generate a high resolution illuminance component frame based on the low resolution frame. The computer-readable medium further includes instructions that direct the processor to generate a high resolution chrominance component frame based on the low resolution frame. The computer-readable medium also further includes instructions that direct the processor to and combine the high resolution illuminance component frame and the high resolution chrominance component frame to generate a high resolution frame.

Example 22 includes the computer-readable medium of example 21, including or excluding optional features. In this example, the computer-readable medium includes instructions that cause the processor to train a convolutional neural network using nearest neighbor downsampling of high resolution ground truth training frames.

Example 23 includes the computer-readable medium of any one of examples 21 to 22, including or excluding optional features. In this example, the computer-readable medium includes instructions that cause the processor to train a convolutional neural network using a self-similarity loss function.

Example 24 includes the computer-readable medium of any one of examples 21 to 23, including or excluding optional features. In this example, the computer-readable medium includes instructions that cause the processor to generate the high resolution illuminance component frame using a convolutional neural network (CNN) with a reduced residual block group.

Example 25 includes the computer-readable medium of any one of examples 21 to 24, including or excluding optional features. In this example, the computer-readable medium includes instructions that cause the processor to generate the high resolution illuminance component frame using a convolutional neural network (CNN) with a parametric rectified linear unit (PReLU) activation.

Example 26 includes the computer-readable medium of any one of examples 21 to 25, including or excluding optional features. In this example, the computer-readable medium includes instructions that cause the processor to adapt a feature map size of the convolutional neural network to a resolution of the low resolution frame.

Example 27 includes the computer-readable medium of any one of examples 21 to 26, including or excluding optional features. In this example, the computer-readable medium includes instructions that cause the processor to adjust a number of feature maps in the convolutional neural network based on a memory bandwidth available to the processor.

Example 28 includes the computer-readable medium of any one of examples 21 to 27, including or excluding optional features. In this example, the computer-readable medium includes instructions that cause the processor to: receive training frames; downscale the training frames to generate low resolution training frames; process the low resolution training frames to generate reconstructed high resolution frames; calculate a loss based on a comparison of the training frames with the reconstructed high resolution frames; and backpropagate the calculated loss.

Example 29 includes the computer-readable medium of any one of examples 21 to 28, including or excluding optional features. In this example, the computer-readable medium includes instructions that cause the processor to: process reconstructed high resolution frames to generate downsampled frames; calculate a self-similarity loss based on a comparison of low resolution training frames with the downsampled frames; calculate a final loss based on the self-similarity loss and a loss calculated between high resolution training frames and the reconstructed high resolution frames; and backpropagate the convolutional neural network based on the calculated final loss.

Example 30 includes the computer-readable medium of any one of examples 21 to 29, including or excluding optional features. In this example, the computer-readable medium includes instructions that cause the processor to receive an RGB component frame and convert the RGB color frame into a YUV component frame.

Example 31 is a system for super resolution imaging. The system includes a convolutional neural network to receive a low resolution frame and generate a high resolution illuminance component frame. The system also includes a hardware scaler to receive the low resolution frame and generate a high resolution chrominance component frame. The system further includes a combiner to combine the high resolution illuminance component frame and the high resolution chrominance component frame to generate a high resolution frame.

Example 32 includes the system of example 31, including or excluding optional features. In this example, the convolutional neural network is trained on additional training frame pairs generated including augmented parts generated using nearest neighbor downsampling of high resolution ground truth training frames.

Example 33 includes the system of any one of examples 31 to 32, including or excluding optional features. In this example, the convolutional neural network is trained using a self-similarity loss function.

Example 34 includes the system of any one of examples 31 to 33, including or excluding optional features. In this example, the convolutional neural network includes a small scale network based on enhanced deep super-resolution.

Example 35 includes the system of any one of examples 31 to 34, including or excluding optional features. In this example, the convolutional neural network includes a parametric rectified linear unit (PReLU) activation.

Example 36 includes the system of any one of examples 31 to 35, including or excluding optional features. In this example, the convolutional neural network is to generate reconstructed high resolution frame from a low resolution training frame during training. The reconstructed high resolution frame and a ground truth high resolution frame are used to calculate a loss used to train the convolutional neural network.

Example 37 includes the system of any one of examples 31 to 36, including or excluding optional features. In this example, the system includes a CNN based downsampler to downsample a reconstructed high resolution frame for training the convolutional neural network.

Example 38 includes the system of any one of examples 31 to 37, including or excluding optional features. In this example, the system includes a self-similarity loss calculator to calculate a self-similarity loss based on a CNN based downsampled frame generated from a reconstructed high resolution frame and a low resolution training frame generated by downscaling a high resolution ground truth frame.

Example 39 includes the system of any one of examples 31 to 38, including or excluding optional features. In this example, the system includes a final loss calculator to calculate a final loss based on a loss and a self-similarity loss, the final loss used to train the convolutional neural network during training.

Example 40 includes the system of any one of examples 31 to 39, including or excluding optional features. In this example, a feature map size of the convolutional neural network is optimized to improve cache locality.

Example 41 is a system for super resolution imaging. The system includes means for generating a high resolution illuminance component frame based on a received low resolution frame. The system also includes means for generating a high resolution chrominance component frame based on the received low resolution frame. The system further includes means for combining the high resolution illuminance component frame and the high resolution chrominance component frame to generate a high resolution frame.

Example 42 includes the system of example 41, including or excluding optional features. In this example, the means for generating the high resolution illuminance component frame is trained using nearest neighbor downsampling of high resolution ground truth training frames.

Example 43 includes the system of any one of examples 41 to 42, including or excluding optional features. In this example, the means for generating the high resolution illuminance component frame is trained using a self-similarity loss function.

Example 44 includes the system of any one of examples 41 to 43, including or excluding optional features. In this example, the means for generating the high resolution illuminance component frame includes a small scale network based on enhanced deep super-resolution.

Example 45 includes the system of any one of examples 41 to 44, including or excluding optional features. In this example, the means for generating the high resolution illuminance component frame includes a parametric rectified linear unit (PReLU) activation.

Example 46 includes the system of any one of examples 41 to 45, including or excluding optional features. In this example, the means for generating the high resolution illuminance component frame is to generate reconstructed high resolution frame from a low resolution training frame during training. The reconstructed high resolution frame and a ground truth high resolution frame are used to calculate a loss used to train the means for generating the high resolution illuminance component frame.

Example 47 includes the system of any one of examples 41 to 46, including or excluding optional features. In this example, the system includes means for downsampling a reconstructed high resolution frame for training the means for generating the high resolution illuminance component frame.

Example 48 includes the system of any one of examples 41 to 47, including or excluding optional features. In this example, the system includes means for calculating a self-similarity loss based on a CNN based downsampled frame generated from a reconstructed high resolution frame and a low resolution training frame generated by downscaling a high resolution ground truth frame.

Example 49 includes the system of any one of examples 41 to 48, including or excluding optional features. In this example, the system includes means for calculating a final loss based on a loss and a self-similarity loss, the final loss used to train the means for generating the high resolution illuminance component frame during training.

Example 50 includes the system of any one of examples 41 to 49, including or excluding optional features. In this example, a feature map size of the means for generating the high resolution illuminance component frame is optimized to improve cache locality.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for super resolution imaging, the apparatus comprising:
   a convolutional neural network (CNN) to be trained based on a self-similarity loss function, the CNN to:
   access a low-resolution frame; and
   generate a high-resolution illuminance component frame;
   machine-readable instructions; and
   at least one processor circuit to be programmed by the machine-readable instructions to:
   calculate a self-similarity loss based on a CNN-based downsampled frame of a reconstructed high-resolution frame and based on a low-resolution training frame generated by downscaling a high-resolution ground truth frame;
   calculate a loss based on the self-similarity loss, a high-resolution training frame, and the reconstructed high-resolution frame;
   backpropagate the loss to the CNN;
   access the low-resolution frame;
   generate a high-resolution chrominance component frame; and
   combine the high-resolution illuminance component frame and the high-resolution chrominance component frame to generate a high-resolution frame.

2. The apparatus of claim 1, wherein the convolutional neural network is trained on additional training frame pairs including augmented parts generated using nearest neighbor downsampling of high-resolution ground truth training frames.

3. The apparatus of claim 1, wherein the convolutional neural network includes a network based on enhanced deep super-resolution.

4. The apparatus of claim 1, wherein the convolutional neural network includes a parametric rectified linear unit (PReLU) activation.

5. The apparatus of claim 1, wherein the convolutional neural network is to generate the reconstructed high-resolution frame from the low-resolution training frame, one or more of the at least one processor circuit to calculate the loss based on the high-resolution ground truth frame.

6. The apparatus of claim 1, wherein the loss is a first loss, one or more of the at least one processor circuit is to calculate the first loss based on a second loss calculated between the high-resolution training frame and the reconstructed high-resolution frame.

7. The apparatus of claim 1, wherein a feature map size of the convolutional neural network is optimized to improve cache locality.

8. A method to train a convolutional neural network (CNN), the method comprising:
   processing, via a CNN-based downsampler, a reconstructed high-resolution frame to generate a downsampled frame;
   calculating, by executing one or more instructions with at least one processor circuit, a self-similarity loss based on a comparison of a low-resolution training frame with the downsampled frame;
   calculating, via one or more of the at least one processor circuit, a first loss based on the self-similarity loss and based on a second loss calculated between a high-resolution training frame and the reconstructed high-resolution frame;
   backpropagating the first loss to the CNN;
   receiving a low-resolution frame;
   generating, via the CNN, a high-resolution illuminance component frame based on the low-resolution frame;
   generating a high-resolution chrominance component frame based on the low-resolution frame; and
   combining, via one or more of the at least one processor circuit, the high-resolution illuminance component frame and the high-resolution chrominance component frame to generate a high-resolution frame.

9. The method of claim 8, including training the convolutional neural network using nearest neighbor downsampling of high-resolution ground truth training frames.

10. The method of claim 8, including training the convolutional neural network using a self-similarity loss function.

11. The method of claim 8, wherein the generating of the high-resolution illuminance component frame is based on the CNN including a reduced residual block group.

12. The method of claim 8, wherein the generating of the high-resolution illuminance component frame is based on the CNN including a parametric rectified linear unit (PReLU) activation.

13. The method of claim 8, including adapting a feature map size of the convolutional neural network to a resolution of the low-resolution frame.

14. The method of claim 8, including adjusting a number of feature maps in the convolutional neural network based on a memory bandwidth available to one or more of the at least one processor circuit.

15. The method of claim 8, including training the convolutional neural network, wherein the training of the convolutional neural network includes:
receiving training frames;
downscaling the training frames to generate low-resolution training frames;
processing, via the convolutional neural network, the low-resolution training frames to generate reconstructed high-resolution frames;
calculating a third loss based on a comparison of the training frames with the reconstructed high-resolution frames; and
backpropagating the third loss.

16. The method of claim 8, including receiving an RGB component frame and converting the RGB component frame into a YUV component frame.

17. At least one hard drive, optical drive, thumbdrive, array of drives, solid-state drive, random access memory (RAM), read only memory (ROM), flash memory, or dynamic random access memory (DRAM) comprising machine-readable instructions to cause processor circuitry to at least:
process, via a convolutional neural network (CNN)-based downsampler, a reconstructed high-resolution frame to generate a downsampled frame;
calculate a self-similarity loss based on a comparison of a low-resolution training frame with the downsampled frame;
calculate a first loss based on the self-similarity loss and based on a second loss calculated between a high-resolution training frame and the reconstructed high-resolution frame;
backpropagate the first loss to a CNN;
access a low-resolution frame;
generate, via the CNN, a high-resolution illuminance component frame based on the low-resolution frame;
generate a high-resolution chrominance component frame based on the low-resolution frame; and
combine the high-resolution illuminance component frame and the high-resolution chrominance component frame to generate a high-resolution frame.

18. The at least one hard drive, optical drive, thumbdrive, array of drives, solid-state drive, RAM, ROM, flash memory, or DRAM of claim 17, wherein the machine-readable instructions are to cause the processor circuitry to train the convolutional neural network using nearest neighbor downsampling of high-resolution ground truth training frames.

19. The at least one hard drive, optical drive, thumbdrive, array of drives, solid-state drive, RAM, ROM, flash memory, or DRAM of claim 17, wherein the machine-readable instructions are to cause the processor circuitry to adjust a number of feature maps in the convolutional neural network based on a memory bandwidth available to the processor circuitry.

20. The at least one hard drive, optical drive, thumbdrive, array of drives, solid-state drive, RAM, ROM, flash memory, or DRAM of claim 17, wherein the machine-readable instructions are to cause the processor circuitry to train the convolutional neural network by:
receiving training frames;
downscaling the training frames to generate low-resolution training frames;
processing, via the convolutional neural network, the low-resolution training frames to generate reconstructed high-resolution frames;
calculating a third loss based on a comparison of the training frames with the reconstructed high-resolution frames; and
backpropagating the third loss.

* * * * *